Figure 1:
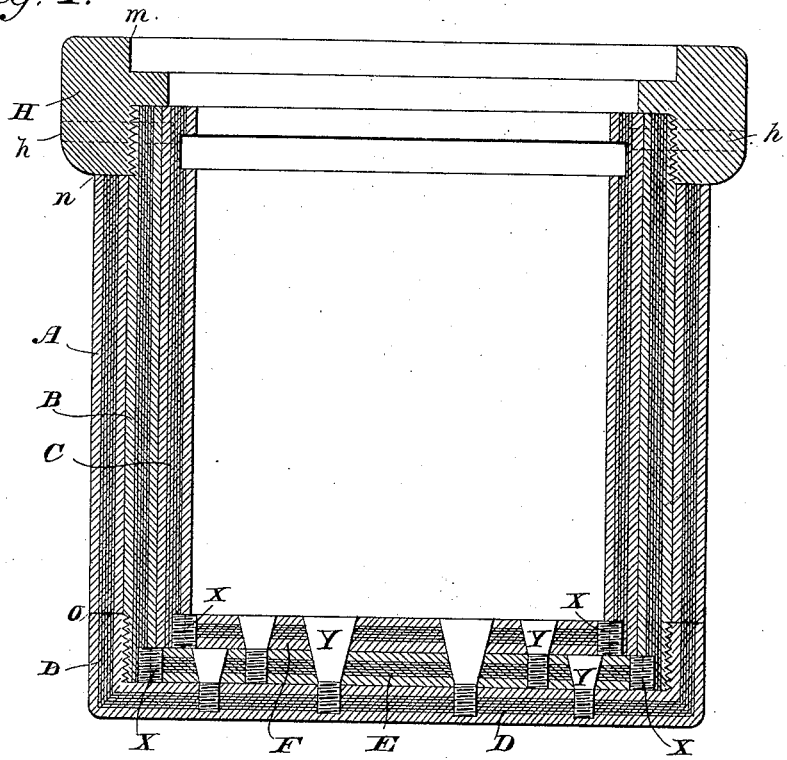

2 Sheets—Sheet 1.

E. STOCKWELL.
Safe.

No. 222,428. Patented Dec. 9, 1879.

WITNESSES
Wm. A. Skinkle.
Geo. W. Breck.

INVENTOR
Emory Stockwell.
By his Attorneys
Baldwin, Hopkins, & Peyton.

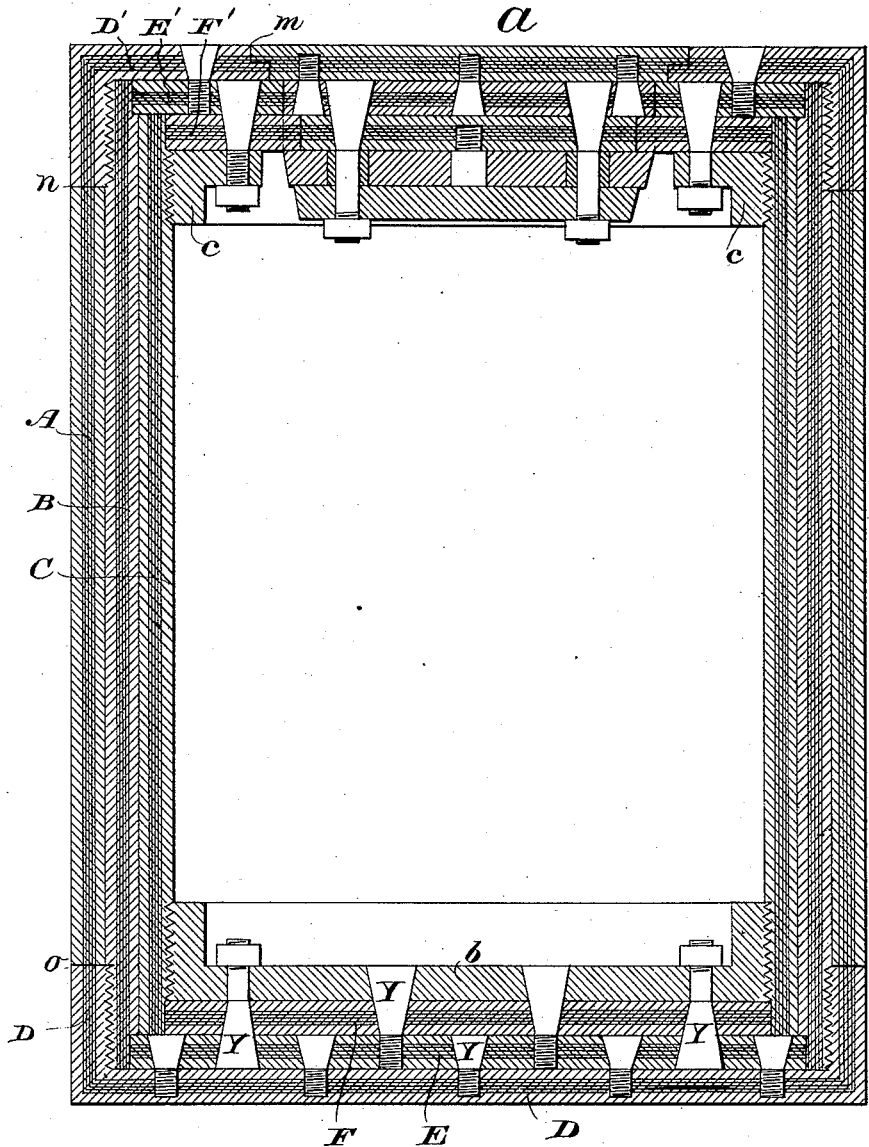

UNITED STATES PATENT OFFICE.

EMORY STOCKWELL, OF STAMFORD, CONNECTICUT, ASSIGNOR TO THE YALE LOCK MANUFACTURING COMPANY, OF SAME PLACE.

IMPROVEMENT IN SAFES.

Specification forming part of Letters Patent No. 222,428, dated December 9, 1879; application filed May 5, 1879.

*To all whom it may concern:*

Be it known that I, EMORY STOCKWELL, of Stamford, in the county of Fairfield and State of Connecticut, have invented certain Improvements in Safes, of which the following is a specification.

My plan is to construct safe-bodies of hollow metallic cylinders of different diameters, one fitting within another, and to close one end of these cylinders with circular heads and the other with circular flanges, forming a stepped jamb for a door, which I also prefer to make circular; but the shape of the door may be different.

The use of such cylinders and circular heads and flanges enables me to make safes which are much more secure against attacks of burglars than any heretofore made, while at the same time the cost of manufacture is lessened.

In all laminated steel and iron safes heretofore made, so far as my knowledge extends, serious defects have existed. In consequence of the shape of the plates used in their construction it has been impossible, by any reasonably cheap and practicable means, to bring the plates to a more exact and even surface than they have after leaving the rolls. After the plates are rolled they must be hardened, and as this process induces more or less spring in the metal the surfaces of the plates become still more uneven. Now, when these plates with uneven surfaces are placed together, one above the other, to form the walls of a safe, there will be numerous places where the adjoining plates are not in contact. Hence it is found not a difficult thing to draw the temper from the outside plate by heat and bore it through, then to soften and bore through the next plate, and so on till an entrance to the interior of the safe has been effected which will admit explosives. Furthermore, the safes in common use are formed of a great many different parts united together, which causes a great many joints, and correspondingly weakens the structure. Square doors for safes always have straight-line joints, which are more or less subject to wedging, rendering practicable the use of explosives to attack them.

In my safe I have endeavored to obviate all these defects. I form my cylinders of any desired material and in any desired manner. Preferably I bend a sheet of laminated steel and iron into cylindrical form and then weld the ends together. For convenience of working, I prefer to have the outside surfaces of these plates or cylinders of iron, the steel being in the middle. The cylinders are now to be bored, ground, or turned to a perfect gage, so that one will exactly fit within another. It will thus be possible to build a safe-body of any desired thickness which will present no cracks or crevices to facilitate drawing the temper, wedging, or the use of explosives. As the heads of my safe are also circular, they can be turned to an exact surface; and when they are fastened in place, as hereinafter described, my safe will be equally strong and impregnable at all points.

For the door of my safe I prefer to use the one described in my Patent No. 206,147; but obviously any other form of door could be used. A round door may be turned and ground into place, thus insuring joints as perfect as those between the cylinders, this tightness and perfection of joints being among the chief characteristics and advantages of my safe.

Figure 2:
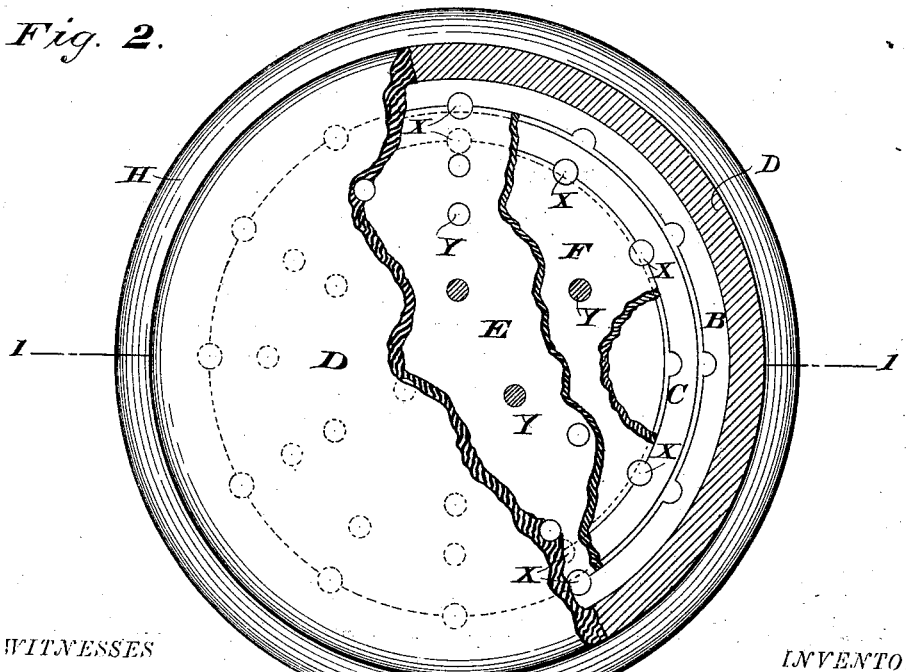

In the accompanying drawings, which represent two forms of embodiment of my invention, Figure 1 is a section of my cylindrical safe through the line 1 1 of Fig. 2. Fig. 2 is a rear-end view of the same, partly in section; and Fig. 3 represents a formal modification in section.

F and E are the heads of the cylinders C and B, and are secured to their respective cylinders by screw-studs X. The peripheries of the heads might be screw-threaded, and the heads thus screwed into corresponding threads on the inside of the cylinders. The outside cylinder, A, is shorter than the cylinder B, which projects beyond it at front and back, and is screw-threaded on its exterior as far as it thus projects.

On the rear end of B is screwed a cap, D, which forms the rear wall of the safe. The heads F and E are bolted to each other and to the cap D by conical bolts Y. To the front end of the cylinder B is screwed a heavy collar, H, which forms part of the jamb of the door, and overlaps both cylinders A and C. It is prevented from being unscrewed by pins h h, which are driven through it into the cylinders B C. The cap D may be secured in a similar manner, and when this is done the cylinders are sufficiently secured together without the bolts Y Y, because the cap and collar prevent motion in either direction.

In Fig. 3, which shows another form of embodiment of my invention, a indicates a door closed and fastened according to my patent above mentioned, and of less diameter than the interior diameter of the safe. It also shows an extra flanged plate, b, screwed into the rear end of the interior cylinder, and a flanged screw-threaded annulus, c, in a corresponding position at the front end, both of which serve to strengthen the joints at the ends of the safe; and as the heads F and E are bolted to the plate b, they need not be secured to their respective cylinders by screw-studs or otherwise. The construction of the front end is similar except that the plates are cut out to receive the door. The outside plate is stepped, so that when the door is shut the edge of the plate D' is fully protected against attack.

Both the methods of putting the parts together that are here shown may be varied without departing from the substance of my invention, although I deem them excellent, and they expose but three joints, as at m, n, and o, in the entire safe, including the door, and these are the tightest possible, being made by ground metallic surfaces in contact like those between the cylinders and the plates.

Having thus described my improved cylindrical safe, what I claim as new therein, and desire to secure by Letters Patent, is—

1. The improved safe-body hereinbefore described, composed of two or more metallic cylinders turned or ground to exactly fit one within another.

2. The combination of the interior cylinders, their heads, the exterior cylinder, and the cap, substantially as described.

3. The combination of an interior cylinder, B, an exterior cylinder of less length than the interior cylinder, and the cap, substantially as set forth.

4. The stepped collar H, in combination with a cylindrical safe, substantially as described.

5. The combination of the interior cylinder, B, the shorter exterior cylinder, and the collar, substantially as described.

In testimony whereof I have hereunto subscribed my name.

EMORY STOCKWELL.

Witnesses:
    HERBERT C. STOCKWELL,
    SCHUYLER MERRITT.